United States Patent [19]

Armbruster

[11] Patent Number: 4,722,747
[45] Date of Patent: Feb. 2, 1988

[54] ADD-ON VEHICLE AIR FILTRATION SYSTEM

[76] Inventor: Joseph M. Armbruster, 2700 NE. 47th St., Lighthouse Point, Fla. 33064

[21] Appl. No.: 874,691

[22] Filed: Jun. 16, 1986

[51] Int. Cl.$^4$ .............................................. B01D 53/04
[52] U.S. Cl. ...................................... 55/316; 55/318; 55/319; 55/320; 55/385 A; 55/385 B; 55/487; 98/2.11
[58] Field of Search ................. 55/467, 487, 316, 318, 55/319, 320, 387, 385 A, 385 B, 385 C; 98/2.11, 2.14

[56] References Cited

U.S. PATENT DOCUMENTS

| | | |
|---|---|---|
| 2,430,335 | 11/1947 | Hart . |
| 3,486,436 | 12/1969 | Harbeck . |
| 3,598,197 | 6/1969 | Neece .................................... 98/2.11 |
| 3,657,992 | 4/1972 | Minnick ................................ 98/2.11 |
| 3,659,515 | 5/1972 | Galaniuk . |
| 3,868,896 | 3/1975 | Doll et al. ............................ 98/2.11 |
| 4,189,987 | 2/1980 | Amberg . |
| 4,252,053 | 2/1981 | Muto . |
| 4,370,155 | 1/1983 | Armbruster ........................... 55/316 |
| 4,432,213 | 2/1984 | Katahira . |
| 4,553,992 | 11/1985 | Boissinot et al. ..................... 55/316 |

FOREIGN PATENT DOCUMENTS 2717613 11/1977 Fed. Rep. of Germany ... 55/385 A
1028472 2/1986 Japan .................................. 55/385 B Primary Examiner—Charles Hart
Attorney, Agent, or Firm—Fleit, Jacobson, Cohn & Price

[57] ABSTRACT

An air filtration and purifying system for the air interiorly of a vehicle and is in the form of an add-on device for existing vehicles for removing particulate material and odors. The add-on system may be used in existing vehicles with or without an air conditioning system or heating system and effectively removes airborne particulates such as dust, dirt, pollen and the like and also removes odors such as tobacco, smoke, food, body odors and toxic gases and fumes and the like. Basically, the add-on system includes a housing with blower or fan assemblies associated therewith and forming an air chamber located immediately behind a first stage foam filter and a second stage replaceable filter of activated carbon or other material with air being drawn into the air chamber with the clean air then being discharged from the housing by the blower or fan assemblies in order to discharge clean air throughout the interior of a vehicle which is especially useful in enhancing the health and comfort of the vehicle occupants and provides increased airflow to the rear section of an automobile, van-type vehicle, bus and the like.

9 Claims, 6 Drawing Figures

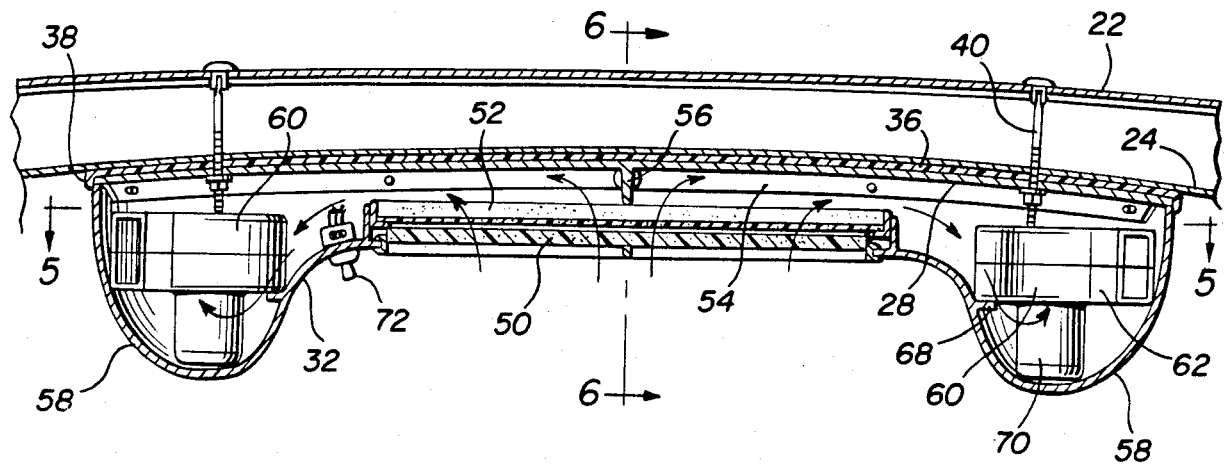
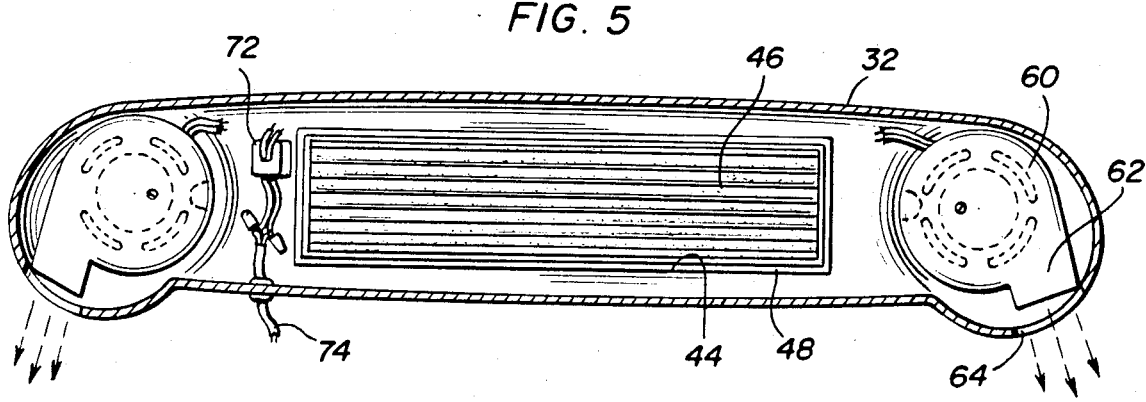
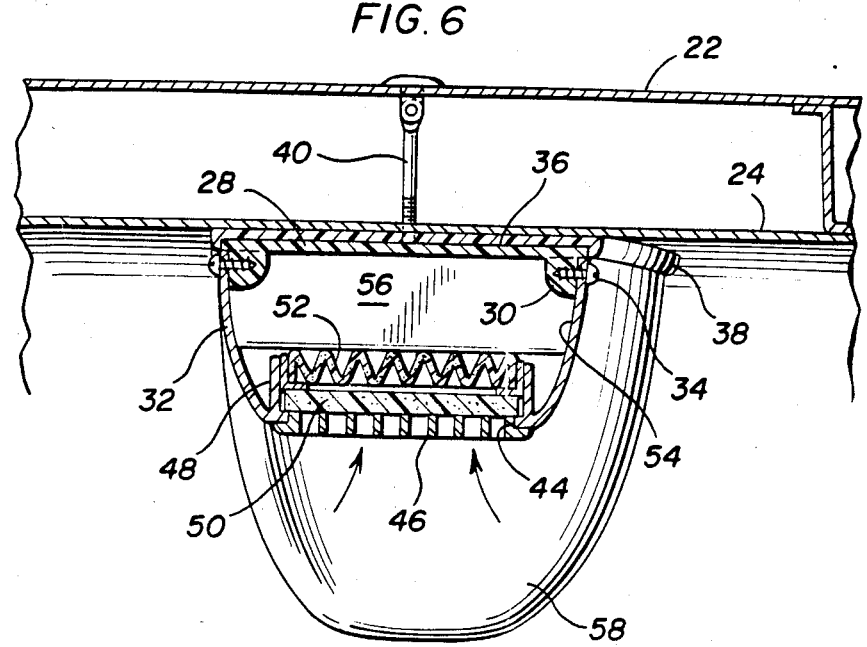

ADD-ON VEHICLE AIR FILTRATION SYSTEM

BACKGROUND OF THE INVENTION

1. Field of the Invention

The present invention relates to an air filtration and purifying system for the air interiorly of a vehicle and is in the form of an add-on device for existing vehicles for removing particulate material and odors as well as toxic gases and fumes. The add-on system may be used in existing vehicles with or without an air conditioning system or heating system and effectively removes airborne particulates such as dust, dirt, pollen and the like and also removes odors such as tobacco, smoke, food, body odors, carbon monoxide, tetraethyl lead and the like. Basically, the add-on system includes a housing with blower or fan assemblies associated therewith and forming an air chamber located immediately inwardly of a foam filter and activated carbon filter with air being drawn into the air chamber through the filters with the clean air then being discharged from the housing by the blower or fan assemblies in order to discharge clean air throughout the interior of a vehicle which is especially useful in providing increased airflow to the rear section of an automobile, van-type vehicle, bus and the like.

2. Information Disclosure Statement

My prior U.S. Pat. No. 4,514,197 issued Apr. 30, 1985 discloses a filter associated with an air circulator in which the filter include a foam component and a carbon component. Also, various types of vehicles including passenger automobiles include optional heating and air conditioning systems in which vehicle interior air can be recirculated and conditioned by either heating or cooling and discharged back into the passenger compartment. However, there is no add-on vehicle air filtration system that can be quickly and easily mounted interiorly of an automotive vehicle for circulating interior vehicle air through a foam filter and carbon filter and discharging it back into the interior of the vehicle.

SUMMARY OF THE INVENTION

An object of the present invention is to provide an add-on vehicle air filtration system comprising a housing including a removable cover section provided with air inlet means and air outlet means, air circulating fan means and a foam filter and charcoal filter in the inlet means by which air can be drawn through the filters into an interior air chamber and discharged from the air outlet means for dispersion substantially throughout an enclosed area of a vehicle.

Another object of the invention is to provide a vehicle air filtration device in accordance with the preceding object in which the housing includes a mounting plate adapted to be connected to the roof area of a vehicle with the air inlet means extending longitudinally at the center portion of the housing and the air outlet means being at the outer ends thereof for discharging air laterally and rearwardly of the interior of a vehicle for dispersion substantially throughout the interior of a vehicle.

A further object of the invntion is to provide an add-on vehicle air filtration and purifying system in accordance with the preceding objects in which the housing includes a mounting plate and removable cover with each end of the housing including an enlarged area receiving a fan assembly with the outlet means being disposed in angular relation for discharge rearwardly and outwardly of the interior of a vehicle.

A still further object of the invention is to provide an add-on vehicle air filtration and purifying system which can be easily added onto various types of vehicular structures having an enclosed compartment or space occupied by a vehicle operator, passengers and the like in which it is desired to recirculate the air in the enclosed space and filter and purify the air by removing particulate material, odors, toxic gases and fumes and the like in order to enchance the comfort and quality of air available to the occupants of the enclosed space with the device being relatively simple in construction and easy to install, service and maintain with the add-on device occupying very little normally usable space in the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a longitudinal sectional view taken along section line 4—4 on FIG. 3 illustrating the relationship of the device to the vehicle.

FIG. 5 is a longitudinal sectional view taken substantially upon a plane passing along section line 5—5 on FIG. 4 illustrating further structural details of the device.

FIG. 6 is a transverse, sectional view, on an enlarged scale, taken substantially upon a plane passing along section line 6—6 on FIG. 4 illustrating further structural details of the device.

DESCRIPTION OF THE PREFERRED EMBODIMENT

Figure 1:
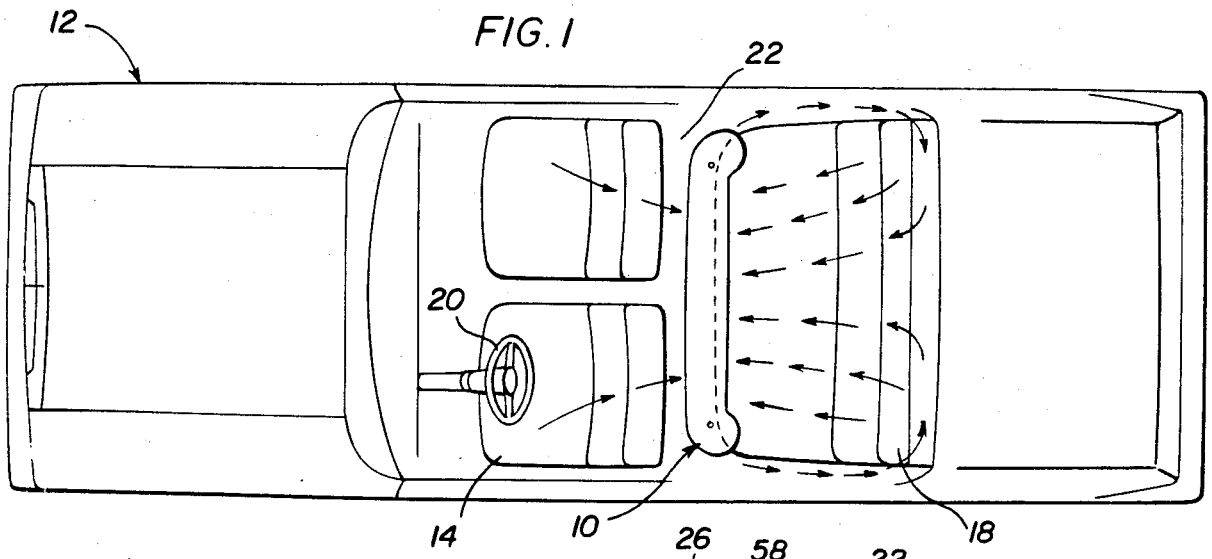
FIG. 1 is a top plan diagrammatic view illustrating the add-on air filtration system of the present invention in a passenger-type vehicle.
Figure 2:
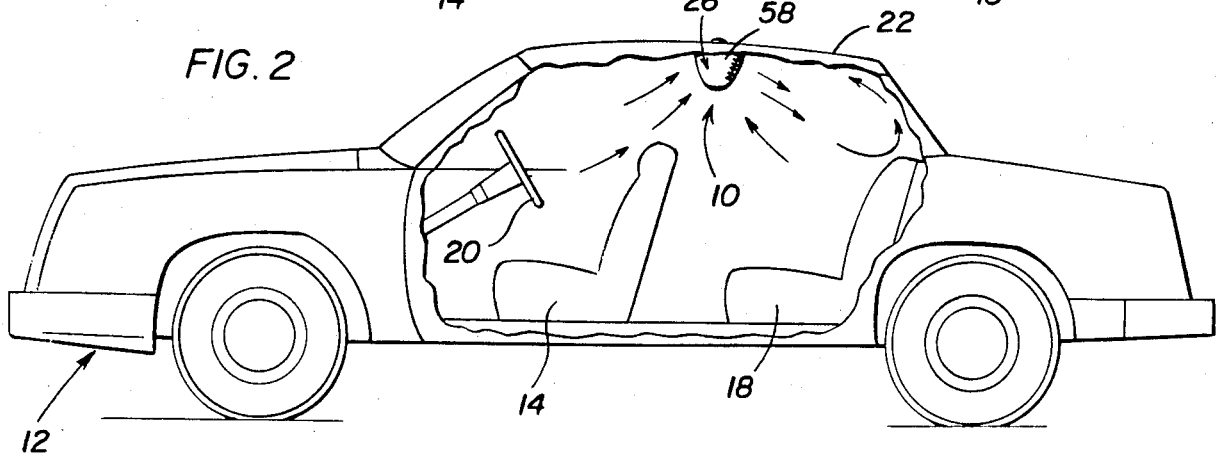
FIG. 2 is a side elevational view of the present invention with portions of the vehicle broken away.
Figure 3:
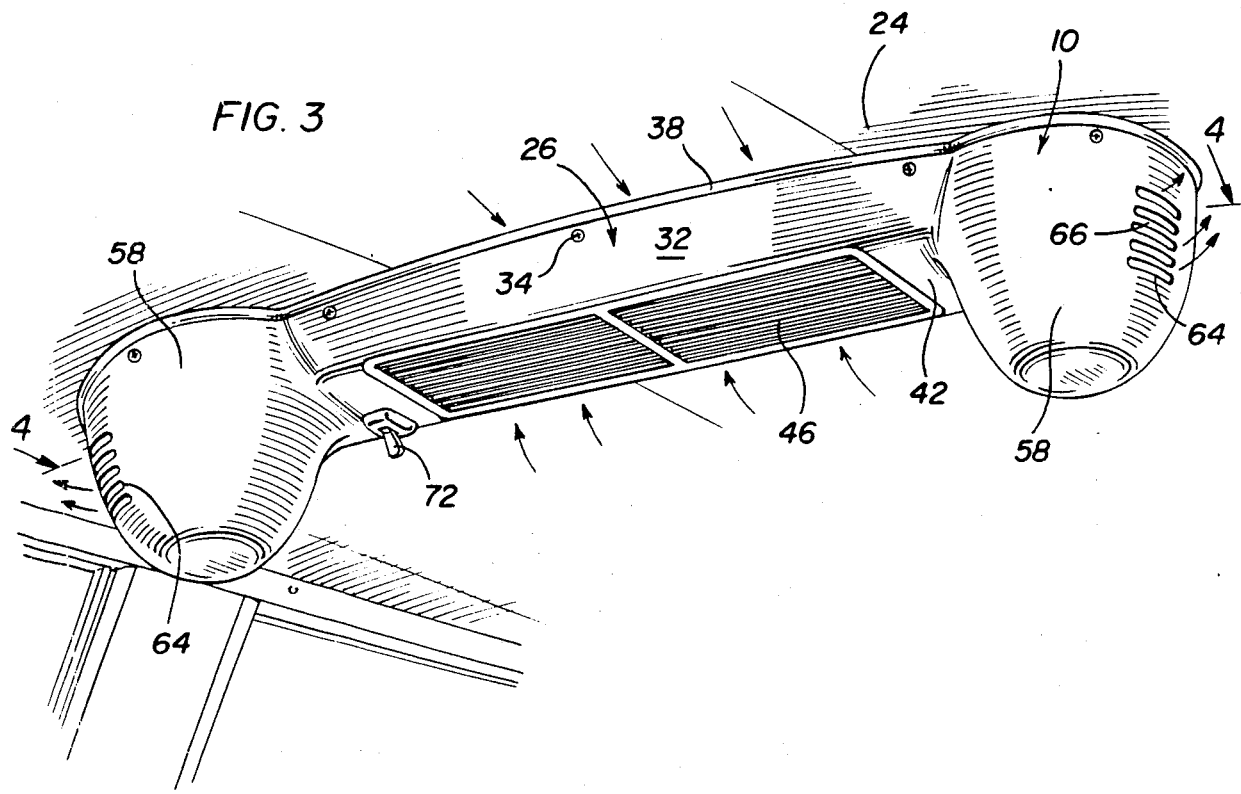
FIG. 3 is a perspective view of the add-on device.

Referring now specifically to the drawings, FIGS. 1 and 2 illustrate the add-on air filtration system of the present invention which is designated by reference numeral 10 and is mounted interiorly of a conventional automobile 12 having the usual front seat 14, rear seat 18, steering wheel 20, roof 22 and headliner 24 all of which represent conventional vehicular structure. The add-on air filtration system 10 of the present invention is installed transversely of the vehicle interiorly of the roof 22 and against the headliner 24 with the air filtration system being located generally above and possibly slightly to the rear of the top of the front seat 14 although the exact position may vary depending upon the characteristics of the vehicle in which the air filtration system 10 is installed. The air filtration system includes a housing generally designated by numeral 26 which includes a support plate 28 having upstanding edge flanges 30 to support a removable cover 32 which telescopes over the flanges 30 and is secured thereto by removable screw threaded fasteners 34 or similar fastening devices by which the cover can be separated from the mounting plate 28 to provide access to the interior of the housing. A gasket of rubber, plastic or the like 36 is interposed between the mounting plate 28 and the headliner 24 and includes a depending flange 38 that has a curved surface to provide a transition strip between the headliner 24 and the cover 32. The support plate 28 is supported from the roof by toggle bolts or other fastening device 40 which extend through the roof panel 22, headliner 24, gasket 36 and support plate 28 with the exterior head of the bolt 40 being rounded and preferably plated to appear neat in appearance with a sealing material interposed between the bolt and roof to maintain the watertight integrity of the roof. Various types of mounting arrangements may be provided and, in some instances may be connected to an interior supporting frame element or the like.

The cover 32 includes an elongated generally flat downwardly facing central portion 42 having an enlarged generally rectangular opening 44 forming an air inlet which is provided with a grill 46 so that air passes into the interior of the cover 32 throughout a substantial portion of the length and width of the downwardly facing lower wall 42 of the cover 32 so that air is taken in from both the front and rear seat compartments of the vehicle. The inlet opening 44 includes an upwardly extending peripheral flange 48 offset slightly outwardly from the periphery of the opening 44 and receiving a foam plastic filter 50 and an activated carbon filter 52 inwardly thereof with the carbon filter 52 including a frame received in the flange 48 with the filter 52 being spaced downwardly from the support plate 28 to form an air chamber 54 with a depending flange 56 on the support plate 28 engaging the carbon filter 52 adjacent the center thereof to retain these components in place and to divide the air chamber 54 into two chambers laterally of the flange 56 which forms a divider. By removing the screws or other fasteners 34, the cover can be removed thereby providing access to the carbon filter 52 and the foam filter 50 for removal and replacement when desired.

Each end of the cover 32 is provided with an enlarged, depending dome-shaped extension 58 offset slightly to the rear and each dome-shaped extension receives and supports a blower 60 in the form of a squirrel-cage blower having a tangential outlet 62 aligned with an outlet opening 64 having a grill 66 formed integrally therewith by forming a plurality of slots and bars or the like with the opening 64 facing outwardly and to the rear as illustrated in the drawings. The squirrel-cage fan or blower 60 is supported on lugs or other similar arrangements 68 to enable air to pass both into the upper and/or lower wall of the blower 60 with the motor 70 for powering the blower 60 being located in the bottom portion of the extension 58 on the housing so that the circulating air will cool the motor and maintain the housing extension 58 in a cool condition. A control switch 72 is mounted in the central flat portion 40 of the cover 32 with the switch controlling supply of electrical energy to the blower from a conductor 74 conducting to a fused source of electrical energy connected appropriately to the electrical system of the vehicle 12 in a conventional manner.

The device can be mounted in substantially any vehicle by using the pivotal toggle bolts that pass through drilled holes in the top of the vehicle or by use of suitable brackets that can be incorporated into the interior of the vehicle to accept mounting hardware. The rubber or plastic transition gasket allows mounting on substantially any interior surface thus permitting a universal application in a variety of vehicles while maintaining a neat and attractive appearance. The two blower assemblies that may be mounted to the supporting plate or supported by the cover are provided with air intakes that are in communication with the air chamber located immediately inwardly of the foam and carbon filters. Air is drawn through the filters and into the chamber area and then into the blowers on the motor side of the blowers or on both sides of the blowers with the clean air then being discharged through the cover to the rear and toward the outside of the interior of the passenger compartment, cabin or the like of the vehicle.

With this arrangement, contaminated air is drawn to the central location of the device which is mounted in the center of the vehicle and does not pass in front of the occupants of the vehicle. The rapid air exchange of the air within the interior of the vehicle eliminates any prolonged breathing ing of contaminated air. The switch can include control for multiple speed blowers as well as the conventional on-and-off function and the switch may include the fuse in the event of malfunction to prevent electrical overload. In addition to filtering, cleaning and purifying the air, another feature involves the ability of the device to develop increased airflow to the rear section of a car or van-type vehicle, bus and the like. This added circulation will augment the normally limited airflow of a conventional air conditioning or heating system to the rear area of the various types of vehicles.

The construction of the device is relatively simple with a base or support plate forming a chassis to support all of the components with support plate 28 being constructed of molded plastic, metal or the like. The blowers can be attached to the supporting plate or to the cover and the two components of the housing may conveniently be molded and secured together with conventional fastening screws. Adjustable louvers may be provided in the air inlet to control inflow of air and adjustable louvers may be provided in the air outlets for adjusting the direction of flow of discharged clean air. The first stage foam filter may be easily removed and washed with ordinary hand soap or detergent (preferably liquid) and running water and then rinsed in running water. The activated carbon filter can be constructed of other material and can be easily removed and replaced with a new filter after reaching its absorption capability since it cannot be cleaned with the specific details of the filters being disclosed in my U.S. Pat. No. 4,514,197. The second stage filter should have a life expectancy of two to six months depending on exposure. The loss of efficiency of the second stage filter is noted when odors can be detected when it is in operation.

The two-stage foam filter and carbon filter removes particulate material as well as odors and airborne toxicity from the air circulating in the interior of the vehicle. The removal of airborne particulates, odors and toxicity that affect allergy and respiratory sufferers greatly enhances the health and comfort of such vehicle occupants by removal of such irritants thereby enabling them to breathe purified air. Also, objectionable and possibly dangerous fumes that may be caused by persons smoking the interior of the vehicle are removed. While squirrel-cage blowers are disclosed, conventional propeller-type fans may also be effectively utilized in distributing the air and for air intake. Accordingly, there has been provided a relatively simple and easily installed add-on air filtering and purifying system for various types of vehicles including conventional automobiles, planes, trucks, buses and the like. Also, the overall size and fan capacity may be varied depending upon the type of existing vehicle in which the add-on unit is to be installed. The unit may be permitted to run for a short interval (2 to 5 minutes) after the ignition key has been turned off by the use of a timer which enables lingering odors to be removed after the vehicle occupants have left.

The foregoing is considered as illustrative only of the principles of the invention. further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An air filtration system for mounting interiorly of a vehicle for circulating, filtering and purifying air within the interior of the vehicle comprising a supporting member adapted to be mounted interiorly of the vehicle, a hollow cover connected to the supporting member with the hollow cover including an air chamber, said cover including an air inlet communicating with the air chamber by which air may move from the interior of the vehicle into the air chamber, an air outlet communicated with the air chamber, fan means communicating with the air chamber, the air inlet and the air outlet for circulating air in through the air inlet, through the air chamber and out through the air outlet and air filtering and purifying means located in the airflow path to remove particulate contaminates from the air and to purify the air prior to the air being discharged back into the interior of the vehicle, said air filtering and purifying means including a foam plastic filter located in the air inlet and a carbon filter located inwardly of the foam plastic filter with the foam plastic filter removing particulate contaminants from the air and the carbon filter purifying the air, said supporting member being in the form of an elongated support plate, mounting means supporting the support plate transversely of the roof of a vehicle interiorly of an enclosed space defining an occupant compartment, said cover being elongated and said air inlet, foam filter and carbon filter being elongated and said support plate and cover being oriented above and slightly to the rear of a seat in the occupant compartment in the vehicle, said carbon filter being spaced from the support plate with the space between the support plate and carbon filter defining said air chamber, said cover including downwardly extending, inverted dome-like extensions at each end thereof with each extension including an air outlet, said fan means including a fan in each extension in communication with the air chamber and an air outlet for moving air through the air inlet, foam plastic filter, carbon filter, air chamber and discharging the air through the air outlets.

2. The system as defined in claim 1 wherein said air outlets are on a generally vertical surface of the extensions and face to the rear and outwardly of the enclosed space of the vehicle for effective circulation of cleaned and purified air.

3. The system as defined in claim 2 wherein each fan includes blower having a vertical rotation axis supported in the extension with each blower including a housing with a depending drive motor supported for circulating air from the air chamber over the motor and into the housing, said housing including a tangential discharge generally in alignment with the air outlet.

4. The system as defined in claim 3 together with a resilient gasket interposed between the support plate and a headliner in the roof of an automobile, said cover including a peripheral edge detachably supported from the support plate, said gasket including a projecting flange telescoped over the peripheral edge of the cover to provide a transition strip between the headliner and cover.

5. The system as defined in claim 4 together with a control switch on the cover adjacent the air inlet and adjacent one of said extensions to enable control of the blowers.

6. The system as defined in claim 5 wherein said support plate includes a depending flange centrally thereof extending transversely of and in engagement with the upper surface of the carbon filter to retain the carbon filter in place and to divide the air chamber into two compartments.

7. The system as defined in claim 6 wherein said means mounting the support plate includes a pair of bolts extending through the roof and including pivotal heads engaged and sealed with respect to the external surface of the roof.

8. An air filtration system for mounting interiorly of a vehicle for circulating, filtering and purifying air within the interior of the vehicle comprising an elongated supporting member adapted to be mounted transversely along the interior of a roof on a vehicle, an elongated hollow cover connected to the supporting member with the hollow cover including an elongated air chamber, said cover including an elongated air inlet communicating with the air chamber by which air may move from the interior of the vehicle into the air chamber, an air outlet at each end of the cover in communication with the air chamber, a blower in each end of the cover in communication with the air chamber and an air outlet for circulating air in through the air inlet, through the air chamber and out through the air outlets and an elongated air filtering and purifying means located in the airflow path between the air inlet and air chamber to remove particulate contaminates from the air and to purify the air prior to the air being discharged back into the interior of the vehicle, said air filtering and purifying means including a foam plastic filter located in the air inlet and a carbon filter located inwardly of the foam plastic filter with the foam plastic filter removing particulate contaminants from the air and the carbon filter purifying the air, said carbon filter being spaced from the supporting member with the space between the supporting member and carbon filter defining said air chamber, said cover including end portions with each end portion including an air outlet, each flower being positioned in an end portion of the cover in communication with the air chamber and air outlet for moving air through the air inlet, foam plastic filter, carbon filter, air chamber and discharging it through the air outlets, said air chamber including a partition depending centrally from the central portion of the supporting member with the lower edge engaging the carbon filter to hold it against the plastic foam filter, said partition being perpendicular to the carbon filter and extending transversely of the air chamber to direct air toward the end portions of the cover.

9. The system as defined in claim 8 together with a resilient member interposed between the supporting member and a headliner in the roof of an automobile, said cover including a peripheral edge detachably supported from the supporting member, said resilient member including a projecting flange telescoped over the peripheral edge of the cover to provide a transition strip between the headliner and cover.

* * * * *